2,944,636

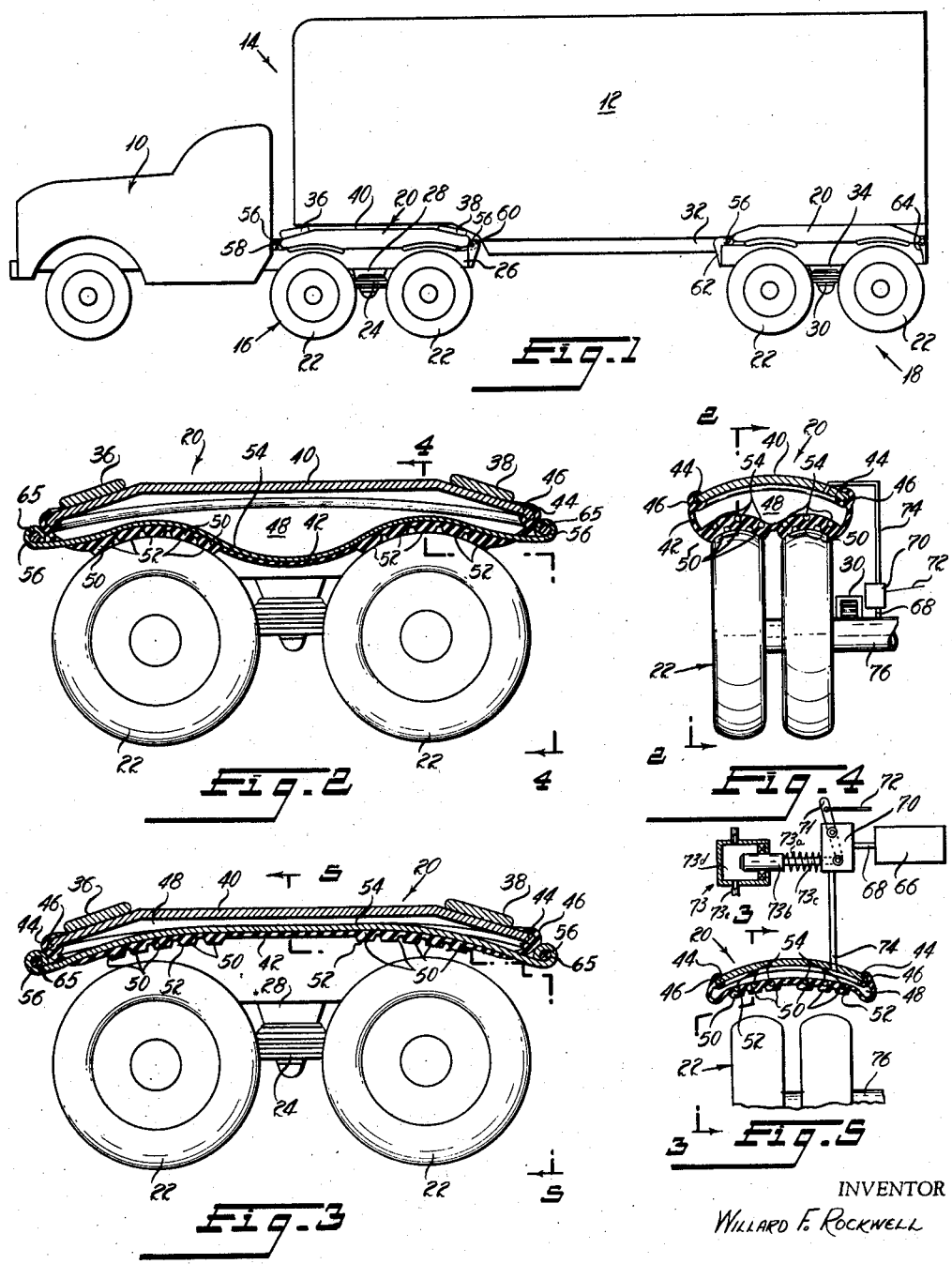

Patented July 12, 1960

2,944,636

EMERGENCY BRAKE

Willard F. Rockwell, Pittsburgh, Pa., assignor to Rockwell-Standard Corporation, a corporation of Pennsylvania Filed July 17, 1956, Ser. No. 598,329

6 Claims. (Cl. 188—29)

The present invention relates to improvements in vehicle brake systems and has particular reference to an independent emergency brake system for use in the event of failure of the vehicle service brakes.

In view of the many accidents which occur on the highways today resulting from failure of the service brakes of heavily loaded trucks, it has become essential that auxiliary brake systems be provided on such vehicles which are completely independent of the service brakes or other fluid systems of the vehicles and which will be effective to arrest vehicle movement in the event of failure of the service brakes. Since any such system adds additional cost to the construction of the vehicle, it is essential, in order to assure the adoption of such auxiliary brakes in the highly competitive trucking industry, that the system be one which can be manufactured, installed and maintained at minimum cost. One solution to this problem is disclosed in my copending application Serial No. 586,603 filed May 22, 1956, now Patent No. 2,893,520, issued July 7, 1959 for Air Spring Emergency Brake. While the brake system of my copending application is of somewhat limited applicability, the invention of the present application is of universal applicability to all heavy duty trucks.

With the foregoing discussion in view, the principal objects of the present invention are to provide an auxiliary brake system of general applicability to heavy duty vehicles for use in the event of service brake failure which:

(1) Is effective to arrest vehicle movement and which is economical to manufacture, install and maintain;

(2) Embodies frame mounted expansible chamber fluid motors which may be actuated under operator control to bring braking surfaces into engagement with the tires of the vehicle wheels to arrest vehicle movement;

(3) Embodies a fluid supply for utilization in expanding the emergency brake fluid motors which is separate and independent from any other vehicle fluid supply;

(4) Embodies expansible chamber fluid motors having a flexible wall provided on the exterior surface thereof adjacent the wheel to be engaged with integral braking cleats for braking engagement with and conformability of the wall to the tire peripheral surfaces; and (5) Embodies an expansible chamber fluid motor having a flexible braking wall internally reinforced by suitable longitudinally extending reinforcing elements such as wire or chains vulcanized into the wall and anchored to the vehicle frame to absorb thrust force imparted to the wall by the tires during emergency braking engagement therebetween.

These and other objects of the present invention will become more fully apparent by reference to the appended claims and as the following detailed description proceeds in reference to the accompanying drawings wherein:

Figure 1 is a side view of a tractor trailer rig equipped with the emergency braking system of the present invention;

Figure 2 is a side view partially in section of one of the tandem axles of the vehicle of Figure 1 illustrating the brake of the present invention in engaged position;

Figure 3 is a view similar to Figure 2 illustrating the brake in its disengaged or retracted position;

Figure 4 is a partially sectioned end view of the brake of Figure 2 constituting a section substantially along the line 4—4 of Figure 2 and illustrating one form of air reservoir of the present invention; and Figure 5 is a partially sectioned end view similar to Figure 4 illustrating that brake in its non-actuated state, constituting a section substantially along the line 5—5 of Figure 3 and illustrating a second embodiment of the fluid supply reservoir.

In Figure 1, a tractor 10 is coupled to a trailer 12 to form a tractor trailer heavy duty vehicle 14. Tractor 10 is suspended at its rear end upon a tandem drive axle unit 16 and trailer 12 is suspended at its rear end upon tandem trailer (dead) axle unit 18 each of which is equipped at its opposite outer ends with pneumatically actuated emergency brake units 20. Tandem axle units 16 and 18 are supported at their outer ends upon pneumatic tire equipped dual wheel assemblies 22. Each wheel assembly 22 is equipped with a conventional type, preferably pneumatically actuated, internally expansible service brake (not shown). A conventional bogie suspension 24 at each end of tandem axle unit 16 is connected to tractor frame 26 by a depending bracket 28 which is fixed to frame 26 and pivoted on suspension 24 in the conventional manner. A bogie suspension 30 at each end of tandem axle unit 18 is connected to trailer frame 32 by a depending bracket 34 fixed to frame 32 and pivoted on suspension 30.

The emergency brake units 20 at each end of tandem axle unit 16 are mounted on the tractor frame 26 between longitudinally spaced brackets 36 and 38. Emergency brake units 20 of tandem trailer axle unit 18 are similarly mounted by conventional means (not shown) on trailer frame 32.

Each emergency brake unit 20 comprises a sturdy metal fender member 40 fixed between brackets 36 and 38 and a flexible expansible diaphragm 42 formed of rubber or other suitable elastomeric material which is formed with a peripheral lip 44 which is fixed and sealed to the peripheral edge 46 of member 40 by conventional means. Member 40 and diaphragm 42 thus define an expansible chamber type fluid motor or air tight air bag enclosure 48. If desired, chamber 48 may be formed by a completely enclosed air bag seated on the bottom of fender 40. Diaphragm 42 is illustrated in its braking position in Figures 2 and 4 and in its retracted or non-braking position in Figures 3 and 5. A plurality of cleats 50 are formed integrally with the exterior of the diaphragm 42 to form brake shoe area surfaces 52 engageable with the exterior periphery of the pneumatic tires of the respective wheel assemblies 22 when diaphragms 42 are expanded as shown in Figures 2 and 4 for emergency braking engagement with the tire peripheries. In the non-braking position, the spacing between the periphery of the tires and the cleats 50 is sufficient to permit free articulation of the bogies without contact therebetween. Use of longitudinally spaced multiple cleats 50 permits free flexure of the relatively thick brake shoe area surfaces 52 as each diaphragm 42 is inflated and expanded from the non-inflated non-actuated state of Figures 3 and 5 to the brake actuated state of Figures 2 and 4 and permit surfaces 52 to properly conform both longitudinally and laterally to the tire tops engaged for maximum effective braking area. In fabrication, diaphragms 42 are so molded that they assume the non-inflated non-actuated configuration of Figures 3 and 5 when fluid pressure in chamber 48 is at atmospheric pressure.

Diaphragms 42 are reinforced by longitudinally extending wires or other suitable reinforcing means such as chain, which extend from end to end through each air bag emergency brake 20 and which are embedded and vulcanized or otherwise bonded to diaphragms 42. Wires 54 are formed at each end with mounting eyes 56 by which wires 54 are anchored respectively to frame projections 58 and 60 on the tractor frame 26 and projections 62 and 64 on the trailer frame 32 by rigid pins 65 fixed at one end to such projections and extending through such eyes. Wires 54 absorb the longitudinal thrust force upon diaphragm 42 during braking engagement and thus prevent longitudinal displacement of braking surfaces 52 to any such degree as would be harmful to diaphragms 42 when cleats 50 come into braking engagement with the tires of wheel assemblies 22.

The chambers 48 of all of the emergency brake units 20 are connected to a common source of fluid under pressure, such as air bottle or reservoir 66, through a common line 68 and a common actuating valve 70 equipped with a control handle 71. When valve 70 is opened by moving handle 71 to the right as viewed in Figure 5, all brake units 20 are actuated simultaneously and under equal fluid pressure. Valve 70 may be located in the vehicle cab to permit direct manual manipulation of handle 71 or, if elsewhere, provided with a pull wire 72 from the cab to handle 71 for control by the operator. If desired, the system can be made fully automatic by the provision of an expansible chamber type fluid motor 73 having a rod 73c, interconnecting the movable element 73b of the motor 73 with the pivoted handle 71 and which is normally resiliently biased by spring 73a in a direction to shift handle 71 to open valve 70 and which is maintained in position to hold valve 70 closed by fluid pressure of the service brake fluid system acting within the chamber 73d of motor 73 so long as the pressure within the service brake fluid system 73e is at operating pressure. The air bottle 66 should be placed on the vehicle body at a position in which it will be readily accessible for replacement, checking and re-charging and should be checked every time emergency brake units 20 have been actuated and at periodic intervals to assure maintenance of adequate fluid pressure. Independent fluid conduits 74 extend from actuating valve 70 to the chamber 48 of each emergency brake unit 20. Alternatively, as illustrated in Figure 4, one of the hollow tubular trailer axles 76 in tandem trailer axle unit 18 may be sealed to render it fluid tight and used as a reservoir or vessel for fluid under pressure for the system in place of air bottle 66.

In operation, when the vehicle operator opens emergency braking valve 70, the expansible chambers 48 of all of the emergency brake units 20 are simultaneously expanded to move the flexible wall or diaphragm 42 thereof from the non-actuated state of Figures 3 and 5 to the actuated state of Figures 2 and 4. In the actuated state, cleats 50 are flexed so that the brake shoe area surfaces 52 of each unit 20 conform to the contours of and are firmly pneumatically biased into braking engagement with the tops of the tires of the associated wheel assemblies 22.

From the foregoing detailed description it is apparent that there is hereby provided a new improved emergency brake system utilizing expansible chamber fluid motors embodying a flexible wall supporting braking surfaces movable between a retracted position and a position in braking engagement with the vehicle tires upon the introduction of fluid pressure into the expansible chamber. It provides an independent air supply for the emergency brake system. It provides braking surfaces integral with diaphragm portions of the flexible wall of the emergency brake expansible chamber fluid motors which flex to conform to the tire exterior peripheries during braking engagement. It further provides internal reinforcing elements bonded into the flexible wall and anchored to the vehicle frame which reinforce the flexible wall and absorb the longitudinal thrust forces imparted to the flexible wall during braking engagement with the vehicle tires. While reference has been made generally throughout this detailed description to the use of air in this system because it is the preferred fluid, it is obvious that any other compressible fluid may be substituted and that in its broadest aspect the present invention contemplates the use of any suitable fluid.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and is desired to be secured by United States Letters Patent is:

1. In an automotive vehicle having a frame suspended upon longitudinally spaced axles support at their outer ends by service brake equipped pneumatically tired ground engaging wheels, an auxiliary brake system for emergency use in stopping said vehicle in the event of failure of the service brakes thereof comprising a movable wall type expansible chamber type fluid motor, means mounting said motors on the vehicle frame with the movable walls thereof in outwardly adjacently spaced relation to the periphery of the pneumatic tire of the wheels at each of the opposite ends of at least one of said axles, means in each of said motors for guiding movement of the movable wall thereof adjacent the associated wheel upon expansion of the chamber of said motor between a retracted position remote from the wheel tire periphery and a braking position in braking contact with the wheel tire periphery, and selectively actuate means for simultaneously actuating said motors, the movable wall of said chamber being an elastomeric diaphragm exposed internally to fluid within said chamber and having an integral external frictional surface.

2. The combination defined in claim 1 wherein said flexible wall comprises a body of elastomeric material integrally formed with a plurality of discrete cleats projecting from the exterior surface thereof toward the periphery of the associated wheel tire and positioned to engage the wheel tire periphery during braking.

3. The combination defined in claim 1 wherein said selectively actuate means comprises a reservoir of fluid under pressure and manually controllable means for connecting each of said motors in simultaneous fluid communication with said reservoir.

4. In an automotive vehicle having a frame suspended upon longitudinally spaced axles supported at their outer ends by service brake equipped pneumatically tired ground engaging wheels, an auxiliary brake system for emergency use in stopping said vehicle in the event of failure of the service brakes thereof comprising a pair of movable wall type expansible chamber fluid motors, means mounting one of said motors on the vehicle frame with the movable wall thereof in outwardly adjacently spaced relation to the periphery of the pneumatic tire of the wheels at each of the opposite ends of at least one of said axles, means in each of said motors for guiding movement of the movable wall thereof adjacent the associated wheel upon expansion of the chamber of said motor between a retracted position remote from the wheel tire periphery and a braking position in braking contact with the wheel tire periphery, and selectively actuate means for simultaneously actuating said motors, said movable wall comprising a body of flexible elastomeric material and said wall guiding means comprising a plurality of longitudinally extending reinforcing elements bonded to said body and anchored to said vehicle frame at least at the end of said wall more closely adjacent the rear of the vehicle.

5. The combination defined in claim 4, wherein said reinforcing elements are wires.

6. The combination defined in claim 4, wherein said reinforcing elements are chains.

References Cited in the file of this patent

UNITED STATES PATENTS

| | | |
|---|---|---|
| 433,414 | Lawrence | July 29, 1890 |
| 598,766 | Campany | Feb. 8, 1898 |
| 600,459 | Terrell | Mar. 8, 1898 |
| 1,823,888 | Dorris et al. | Sept. 22, 1931 |
| 2,257,610 | Kraft | Sept. 30, 1941 |
| 2,637,427 | Kraft | May 5, 1953 |
| 2,723,015 | Wellauer | Nov. 8, 1955 |
| 2,810,458 | Troxell | Oct. 22, 1957 |

FOREIGN PATENTS

| | | |
|---|---|---|
| 1,061,792 | France | Dec. 2, 1953 |
| 118,456 | Germany | July 10, 1930 |
| 138,761 | Great Britain | Feb. 19, 1920 |